Sept 17, 1957  W. H. HOGAN  2,806,263
CONTINUOUS CASTING APPARATUS AND LOAD HANDLING
AND SUPPORTING APPARATUS THEREFOR
Filed Oct. 7, 1953  8 Sheets-Sheet 2

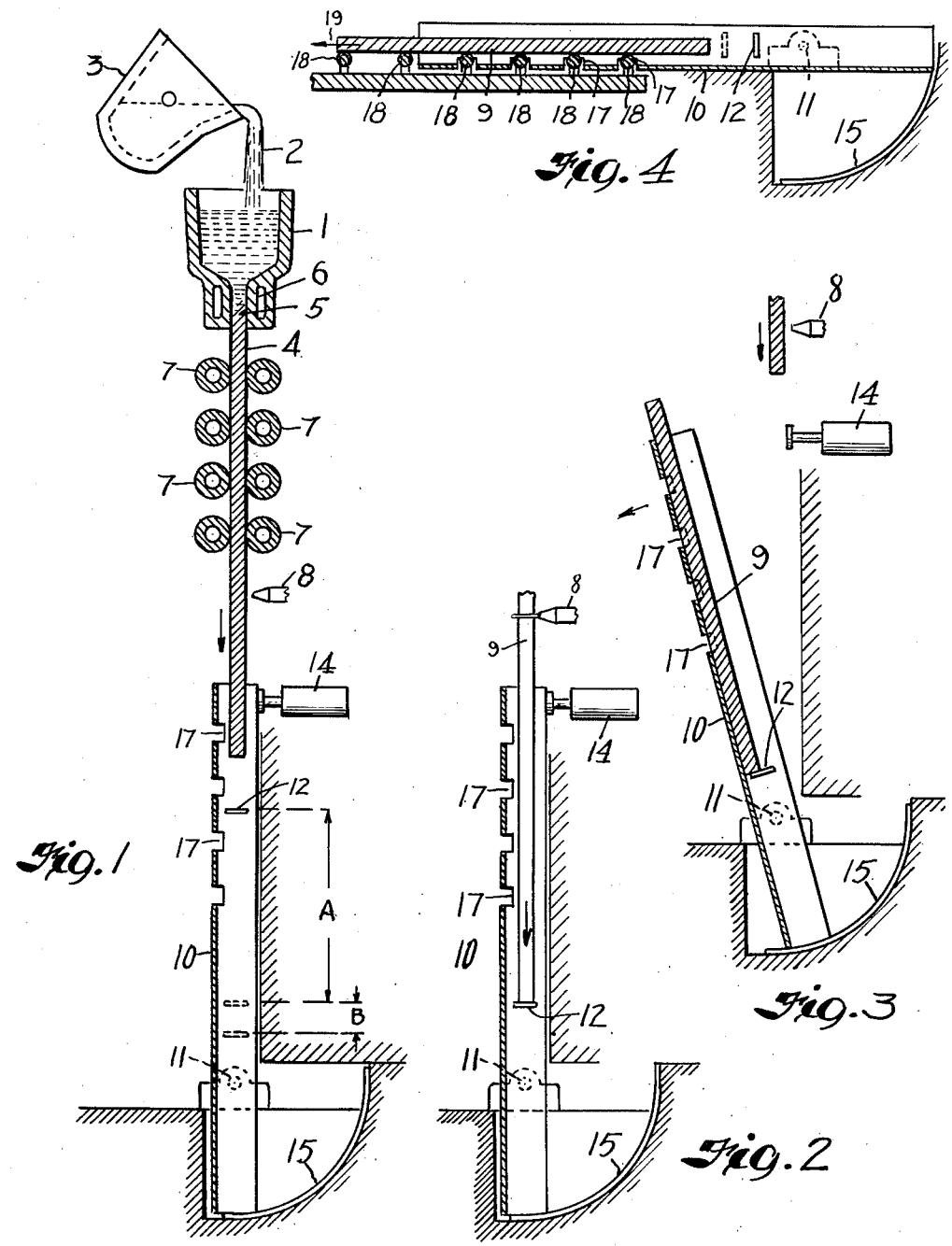

INVENTOR.
WALTER H. HOGAN
BY
Oberlin & Limbach
ATTORNEYS.

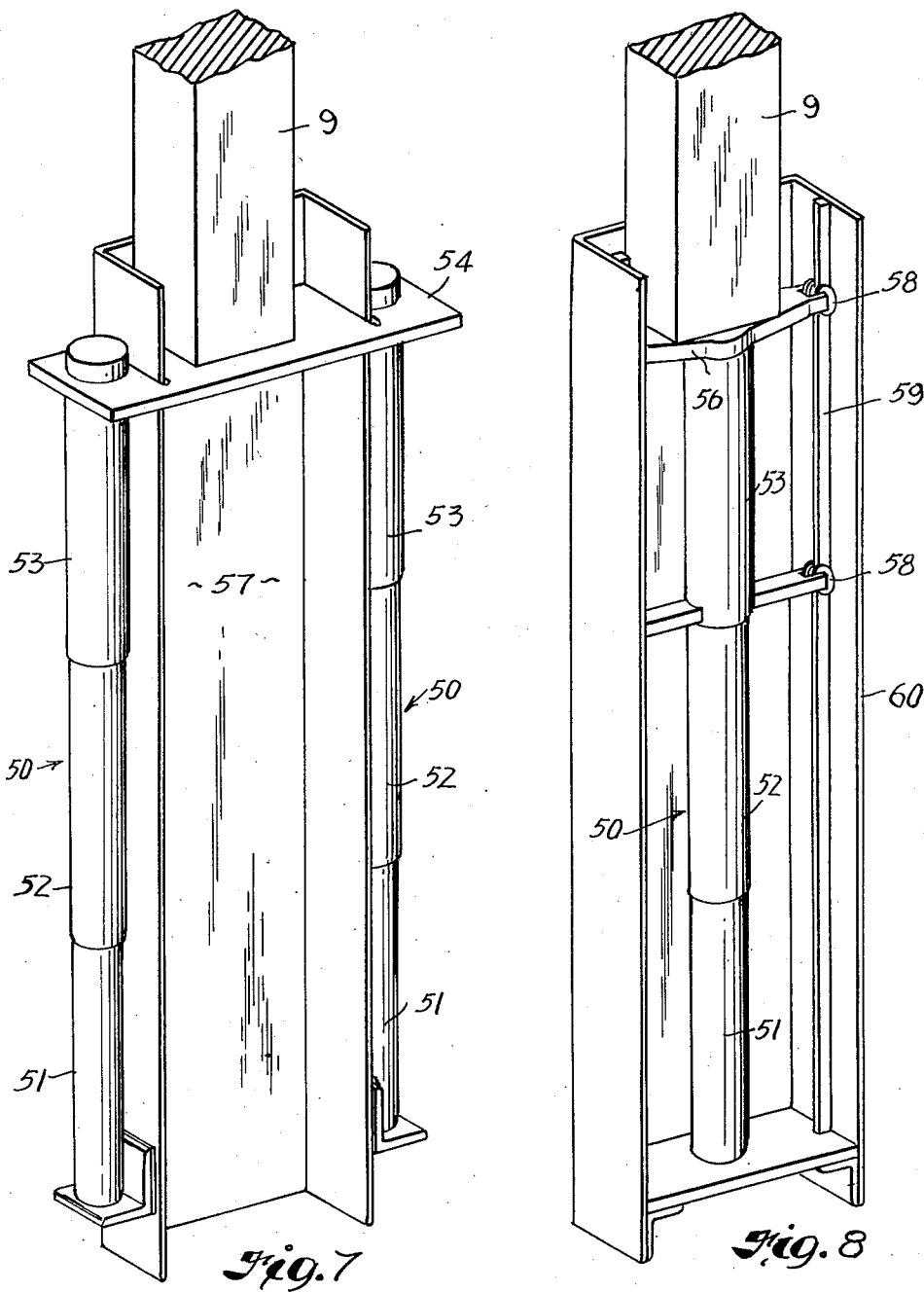

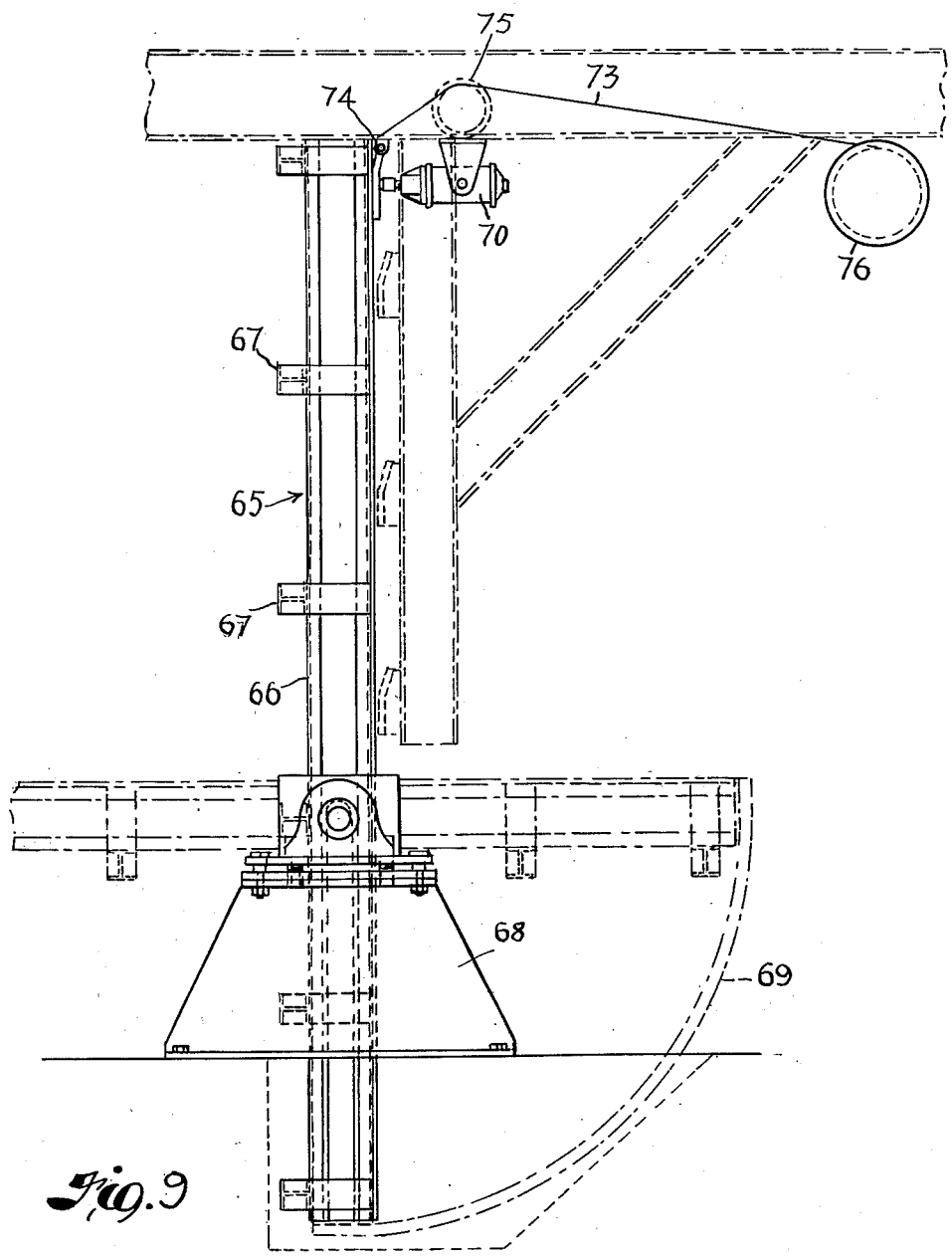

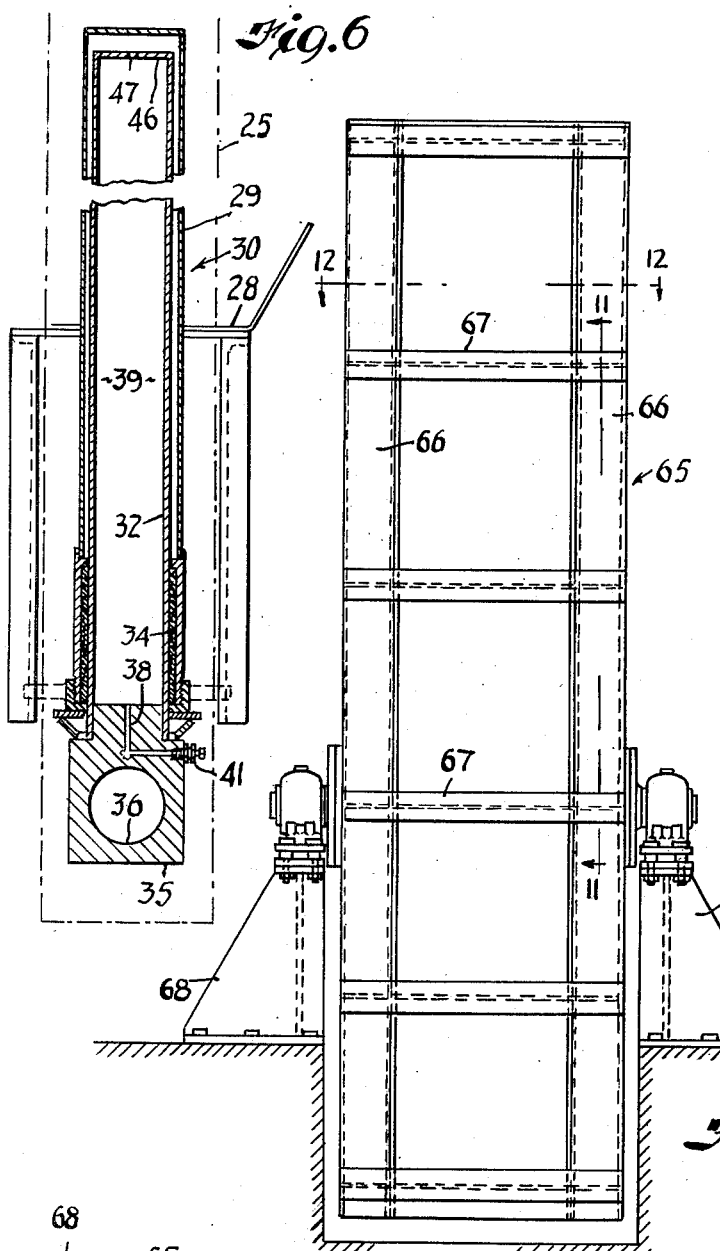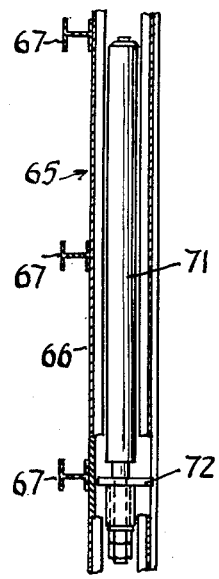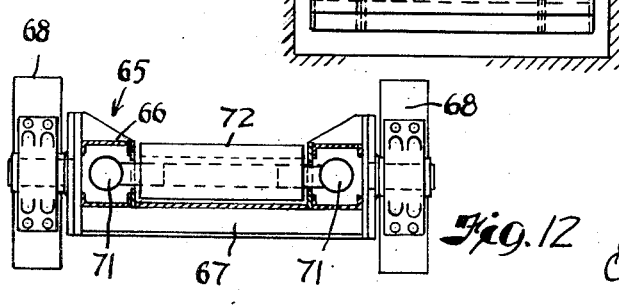

Sept 17, 1957 W. H. HOGAN 2,806,263
CONTINUOUS CASTING APPARATUS AND LOAD HANDLING
AND SUPPORTING APPARATUS THEREFOR
Filed Oct. 7, 1953 8 Sheets-Sheet 6

INVENTOR.
WALTER H. HOGAN
BY
Oberlin & Limbach
ATTORNEYS.

United States Patent Office 2,806,263
Patented Sept. 17, 1957

2,806,263

CONTINUOUS CASTING APPARATUS AND LOAD HANDLING AND SUPPORTING APPARATUS THEREFOR

Walter H. Hogan, Olmsted Falls, Ohio, assignor to The Cleveland Pneumatic Tool Company, Cleveland, Ohio, a corporation of Ohio Application October 7, 1953, Serial No. 384,618

3 Claims. (Cl. 22—57.2)

The present invention relates generally as indicated to load handling and supporting apparatuses, and more particularly to such apparatuses in association with, for example, continuous down-casting apparatus, article dispensing or storage apparatus, and spring-mounted vehicles subjected to varying loads.

In continuous casting apparatus of the character referred to above, a downwardly moving casting continuously emerges from the bottom open end of a chilled mold and is periodically severed to form bars of predetermined length as the lower end of such casting approaches a shelf or platform located transversely across a vertically disposed cradle or trough into which said casting moves. In order to prevent re-welding together of the bar and casting where severed, the bar is allowed to drop freely onto the platform or shelf, thereby resulting in severe shock loads on the apparatus and also in the possibility of distortion of the lower end of the bar especially when in a highly heated state at the time of contact with the platform. This mode of operation also results in ragged ends on the cut bars because the entire weight thereof hangs from the casting during cutting and tears away before the cut is completed. The cradle or trough and bar therein is then moved from vertical position to substantially horizontal position whereat the severed bar is discharged from the cradle whereupon said cradle is promptly returned to vertical position preparatory to catching the next severed length of the casting. For an example of this type of apparatus, see the Harter Jr. et al. Patent No. 2,582,329, dated January 15, 1952.

In the case of apparatuses for storing or dispensing articles, it has been proposed heretofore to employ coil springs which have a spring rate or deflection per unit load such that the basket, container, shelf, or similar unit on which said springs react and upon which articles of uniform weight and size are adapted to be stacked moves up or down as articles are removed from or added to the stack to maintain top article of the stack at substantially a uniform level. It has also been proposed to provide apparatus of this character wherein counterbalancing weights, instead of coil springs, are automatically added to or subtracted from the stack supporting unit according to whether articles are added to or subtracted from the stack, the displacement of the stack supporting unit again, as in coil spring apparatuses, being such that the top article of the stack is at substantially a uniform level irrespective of the number of articles in such stack. The following patents are representative of prior art apparatuses of the spring and weight types aforesaid:

Spring type: Gibbs, 2,226,308; Gibbs, 2,251,873; Gibbs, 2,251,874; Gibbs, 2,251,875; Gibbs, 2,251,876; Gibbs, 2,426,955; Gibbs, 2,449,892; Gibbs, 2,461,638; Gibbs et al., 2,626,727; Bockius, 2,560,928; Jensen, 2,601,295; Larsen, 2,609,265; Saul, 2,468,115; Hope, 2,534,169; Layher, 2,296,215; and Leonard, 2,319,872.

Weight type: Giesler et al., 2,560,639; Klemm et al., 2,493,976; and Wessman, 1,878,354.

One serious drawback of apparatuses of the types aforesaid is that an infinite number of coil springs with different spring rates, or an infinite number of different counterbalancing weights are required in order that the apparatuses can accommodate articles of different sizes or different unit weights while maintaining the top articles at a predetermined level irrespective of the number of articles in the stacks.

In the case of spring-mounted vehicles, such as pick-up trucks or other light-capacity trucks, it is the present practice to equip the same with heavy, stiff springs for handling the maximum loads which are to be imposed thereon, and the same is true of automobiles which tow trailers or the like. This results in hard riding of the vehicle when empty or lightly loaded, and the stiff springs are hard on the tires thereof. On the other hand, if the springs are designed for proper riding characteristics under empty or light load conditions, then the vehicle cannot accommodate satisfactorily heavy loads without bottoming or excessive settling or displacement under the maximum rated loads.

With the foregoing problems, disadvantages, and objections to existing apparatuses in the several categories aforesaid in mind, it is a primary object of this invention to provide a load handling and supporting apparatus which, irrespective of its employment in conjunction with continuous down-casting apparatus or article dispensing storing apparatus or a spring-mounted vehicle, eliminates or minimizes these and other problems, disadvantages, and objections.

It is another object of this invention to provide a yieldable load handling and supporting apparatus which has novel means for adjusting the slope of its deflection-load curve at any preselected position of the load bearing unit thereof whereby, in the case of continuous down-casting apparatus, the load handling and supporting apparatus can be adjusted to accommodate the weights of different severed lengths of bars and the weights of bars of different cross-section sizes and materials; in the case of article dispensing or storing apparatus, said load handling and supporting apparatus can be adjusted to accommodate stacks of articles of different unit weight and size while so counterbalancing the stacks of articles that as articles are added or removed therefrom, the top articles are at a substantially predetermined level; and, in the case of a spring-mounted vehicle, said load handling and supporting apparatus can be adjusted to accommodate different loads on the vehicle while retaining predetermined deflection of the entire spring mounting (that is, the vehicle springs and said apparatus), whereby the vehicle springs may be relatively "soft" for easy riding characteristics of the vehicle when empty or lightly loaded.

It is another object of this invention to provide a yieldable load handling and supporting apparatus which, in combination with continuous down-casting apparatus, functions to exert progressively increasing upward force against the lower end of the casting as the latter moves downwardly thereby to partially relieve the otherwise progressively increasing tensile stresses in the downwardly moving casting.

It is another object of this invention to provide a yieldable load handling and supporting apparatus which, in combination with continuous down-casting apparatus, and prior to severing of the casting, functions to exert an upward force on the lower end of the casting which is less than the weight of the severed length whereby the load bearing unit and the severed length descend with respect to the down-moving casting thereabove.

It is another object of this invention to provide a yieldable load handling and supporting apparatus which, in combination with continuous down-casting apparatus, and prior to severing of the casting, functions as a cushioning or dampening means to allow the load bearing unit and severed length of casting engaged therewith to descend, without substantial bouncing or oscillation, to balanced condition with respect to the down-moving casting from which said length was severed.

It is another object of this invention to provide a yieldable load handling and supporting apparatus in which the load bearing unit is reacted upon by a movable element of a fluid cylinder and piston assembly, movement of said element effecting a change in the volume of the fluid in said assembly according to the magnitude of the load on said unit.

It is another object of this invention to provide a yieldable load handling and supporting apparatus of the character indicated in the preceding paragraph which has novel means for adjustably preloading said assembly so that said unit either will be displaced to a predetermined position under the influence of different loads or will be displaced a predetermined amount under the influence of a unit of load added thereto or subtracted therefrom.

It is another object of this invention to provide a yieldable load handling and supporting apparatus of the character having a fluid cylinder and piston assembly and novel means for adjustably preloading said assembly wherein said adjustable preloading involves either static pressure variation, or compression ratio variation, or a combination of these expedients.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Figs. 1 to 4 are vertical cross-section views, somewhat schematic in character, showing the successive positions of one form of my apparatus as employed with a continuous down-casting apparatus;

Fig. 6 is a cross-section view taken substantially along the line 6—6, Fig. 5, except that the upper one of the telescoping tubular members is shown at its lowermost position;

Figs. 7 and 8 illustrate modifications of forms of my apparatus;

Fig. 9 is a side elevation view of an apparatus of the general type illustrated in the schematic drawings, Figs. 1 to 4;

Fig. 10 is an elevation of the Fig. 9 apparatus as viewed from the left-hand side thereof;

Fig. 11 is a fragmentary cross-section view taken along line 11—11, Fig. 10;

Fig. 12 is a horizontal cross-section view taken substantially along the line 12—12, Fig. 10;

Figure 17:
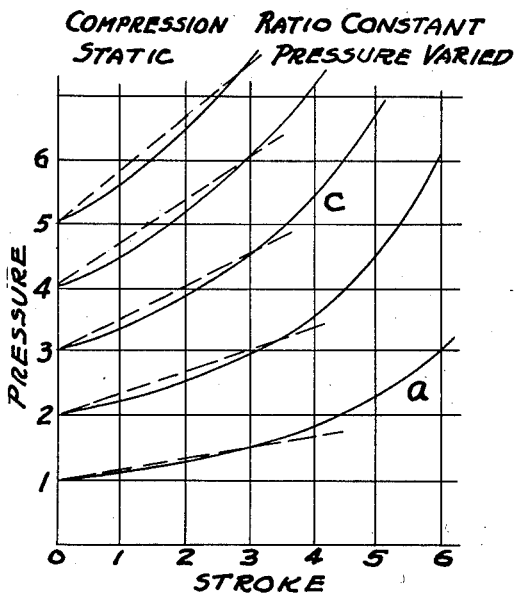
Fig. 17 is a graph showing variation of load-deflection characteristics of a fluid cylinder by maintaining the compression ratio thereof constant and varying the static pressure therein.
Figure 18:
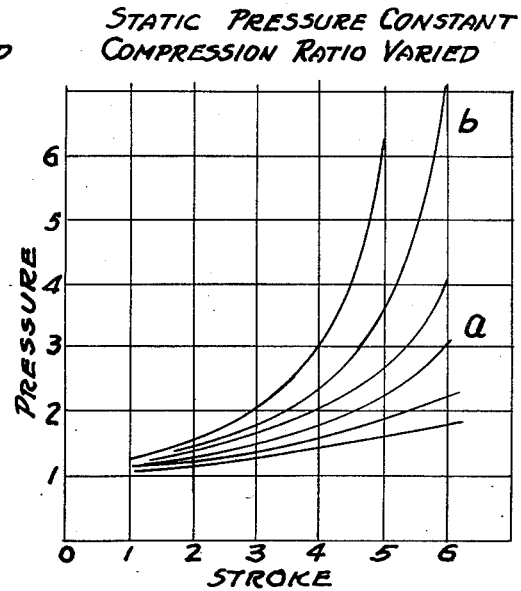
Figure 19:
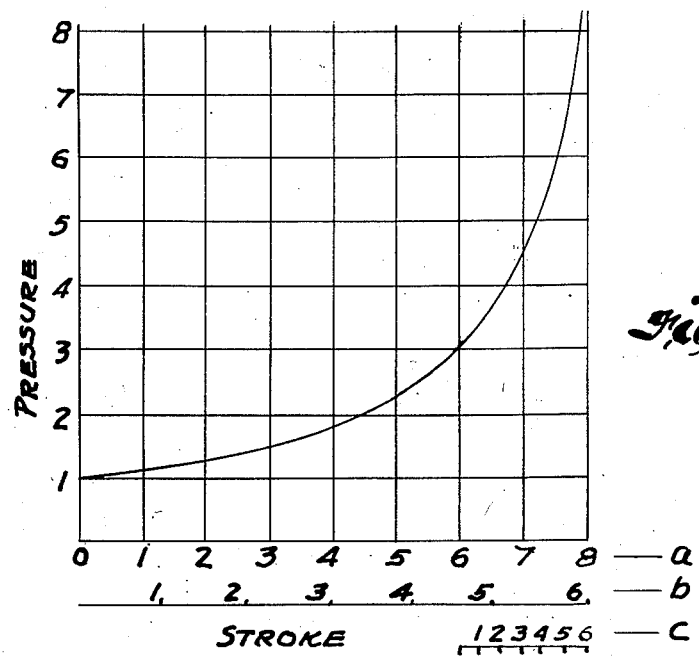

Fig. 18 is also a graph showing variation of load-deflection characteristics of pressure against stroke of a fluid cylinder by maintaining the static pressure thereof constant and varying the compression ratio thereof; and Fig. 19 is also a graph combining the load-deflection (pressure-stroke) curves of the Figs. 17 and 18 graphs into a single curve by utilizing several different scales for the stroke (or deflection) corresponding to the stroke values in Figs. 17 and 18.

Broadly stated, the present invention, irrespective of its particular use, comprises a yieldable load supporting structure, and adjusting means for varying the amount of displacement of said structure from a predetermined position responsive to a unit change of load thereon.

In connection with continuous down-casting apparatus, the present invention can be said to comprise a yieldable platform which is engaged by the lower end of a casting and which offers resistance to the down-moving casting with progressively increasing force, which force at the time of severing has reached a value slightly less than the weight of the severed bar so that said platform and the severed bar engaged therewith will descend with respect to the casting thereabove, the yieldable platform again being adjustable, as aforesaid, to accommodate different lengths of severed bars and different unit weights thereof depending upon the cross-section size and shape and also the density of the particular metal being cast.

Insofar as article dispensing or storing apparatus is concerned, the present invention comprises a yieldable platform, shelf, box, bin, or the like which is adjustable to counterbalance the load of a stack of uniform size and weight articles thereon so that the topmost article will always be at substantially the same level irrespective of the number of articles in the stack.

With reference to spring-mounted vehicles, the present invention comprises a link which is capable of being adjustably preloaded between the chassis (specifically, the rear axle) and the frame of the vehicle to suit the load on the vehicle body, and of being removed from operating position to afford "soft," desirable riding characteristics of the vehicle in empty or lightly loaded conditions.

LOAD HANDLING APPARATUS IN CONJUNCTION WITH CONTINUOUS DOWN-CASTING APPARATUS

I. *Continuous casting apparatus*

As best shown in Fig. 1, a typical continuous down-casting apparatus, with which the present invention has particular utility, comprises a combination crucible and chilled mold 1 into which molten metal 2 such as iron or steel, for example, is supplied as from a tilt crucible or ladle 3, and from which the metal emerges continuously as a down-moving casting 4 of cross-section shape and size the same as that of die passage 5 of said mold 1 which is chilled by circulation of coolant in the passage 6. The rate of downward movement of the casting 4 is controlled as by paired series of power-driven rolls 7 engaged with opposite sides of said casting so as to correspond with the rate of solidification of the metal as it flows downwardly through the chilled die passage 5. These power-driven rolls have the further function of accurately sizing the casting 4 and of smoothing the surfaces thereof. As is well known in the art, the core of the casting 4 may yet be molten when the casting emerges from the bottom of the mold 1; and, of course, the lower end of the casting 4, even after passing below the lowermost pair of rolls 7, will usually be in such highly heated condition as to be readily deformable, if severed and permitted to drop onto a platform as in prior art apparatuses.

Mounted laterally adjacent the downwardly moving casting 4 below the bottom pair of rolls 7 is a severing mechanism which may be of any familiar or suitable type, but preferably a cutting torch 8, as shown, which is mounted for downward movement at the same rate of speed as the casting so as to effect a clean, square cut.

After the casting 4 has been severed to provide a billet 9 of predetermined length, the cutting torch 8 is moved back up to its original position preparatory to severing the casting to provide another billet 9.

As before explained, it has been the prior art practice to allow the severed length 9 of the casting 4 to fall freely onto a shelf or platform which is disposed in a trough-shaped cradle, and then by moving the cradle from vertical to horizontal position, the severed length may be discharged therefrom, whereupon the cradle is quickly returned to vertical position for catching of the next severed length on the shelf thereof. Such dropping of the severed length results in a battering of the lower end thereof, and also results in severe shock on the shelf and cradle mountings. In addition, at the end of a continuous run, the last piece of the casting may drop freely a relatively great distance especially if the top of the casting passes below the bottom pair of rolls 7 before the torch 8 is supposed to start the severing operation.

A complete discussion of the construction and operation of continuous down-casting apparatuses will be found in the articles published in "The Iron Age" April 4, 1940, April 11, 1940, and February 24, 1944.

II. *General structure and operation of billet-handling apparatus*

Referring first to the schematic diagrams, Figs. 1 to 4, the aforesaid cradle or trough 10 is pivotally mounted as at 11 for swinging movement from the vertical position of Fig. 1 to the horizontal position of Fig. 4, and then back again to the vertical position. Vertically movable relative to said trough 10 is a yieldable platform 12 (to be described in detail later) which, for the time being, is described as yieldably movable downwardly when engaged by the lower end of the casting 4 as the casting moves downwardly. The solid line position of said platform 12 in Fig. 1 is its uppermost position. As aforesaid, said platform 12 is yieldable and reacts against the lower end of the casting 4 with a progressively increasing force which, by the time that said platform has been forced down the distance A and the casting 4 has been severed into a billet 9 of predetermined length by torch 8, is slightly less than the weight of said billet so that said platform and billet thereon will descend a further distance B to the counterbalanced position. In this way, the billet 9 moves downwardly with respect to the casting 4 thereabove so that the severed ends will not reweld.

With the billet 9 thus counterbalanced by said yieldable platform 12, the trough tilting cylinder 14 may be actuated to tip or tilt said trough slightly from vertical whereupon it will continue to swing to horizontal position under the control of a suitable arcuately disposed friction, solenoid, or other brake 15 acting on the lower end of said trough.

The cradle or trough 10, when in its horizontal position as shown in Fig. 4, is designed so that power-driven conveyor rolls 18 project up through the slots 17 of said cradle to discharge billet 9 in the direction of arrow 19. The platform 12 is preferably latched in its solid-line position of Fig. 4, or may be allowed to move a slight distance to the left, as for example to the dotted-line position, so as to afford adequate clearance when the cradle 10 is hoisted, by any suitable means, to vertical position. When said cradle 10 has been re-swung to vertical position, said yieldable platform 12 may be unlatched so as to move upwardly for engagement by the lower end of the down-moving casting 4. As evident, said platform 12 may not, in every instance, reach its uppermost Fig. 1 position, before being engaged by the lower end of the casting.

In view of the fact that said platform 12 exerts a progressively increasing force on the lower end of the casting 4, only a small portion of the entire weight of the casting below the bottom set of rolls is effective to tension the casting; and, such being the case, cleaner cuts are assured.

Although not shown, it is to be understood that the operation of cutting torch 8 can be made responsive to the platform descending, under the influence of the down-moving casting, to a predetermined position; and, in fact, the cutting torch 8 can be actuated downwardly by said platform in unison with the casting and then released and de-energized for return to its original inactive position.

III. *Detail structure of yieldable billet supporting platform*

Figure 5A:
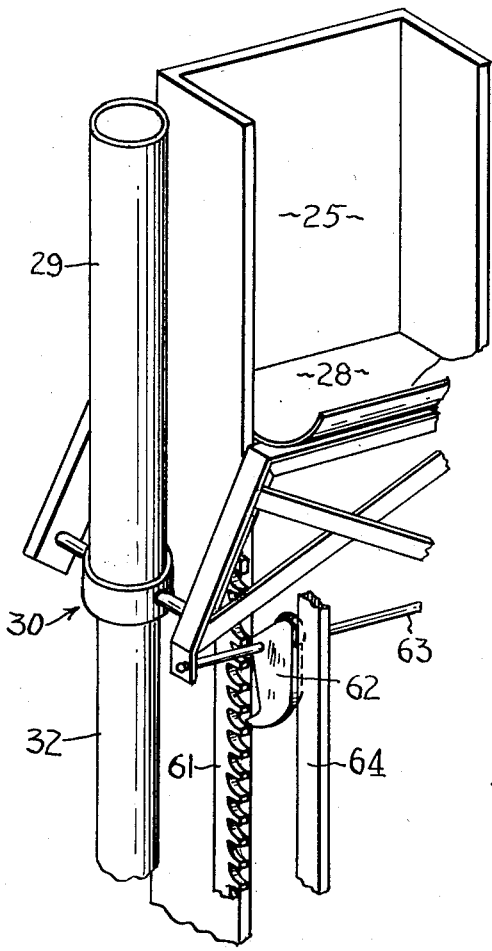
Fig. 5A is a fragmentary perspective view of an apparatus employing a ratchet mechanism.
Figure 5:
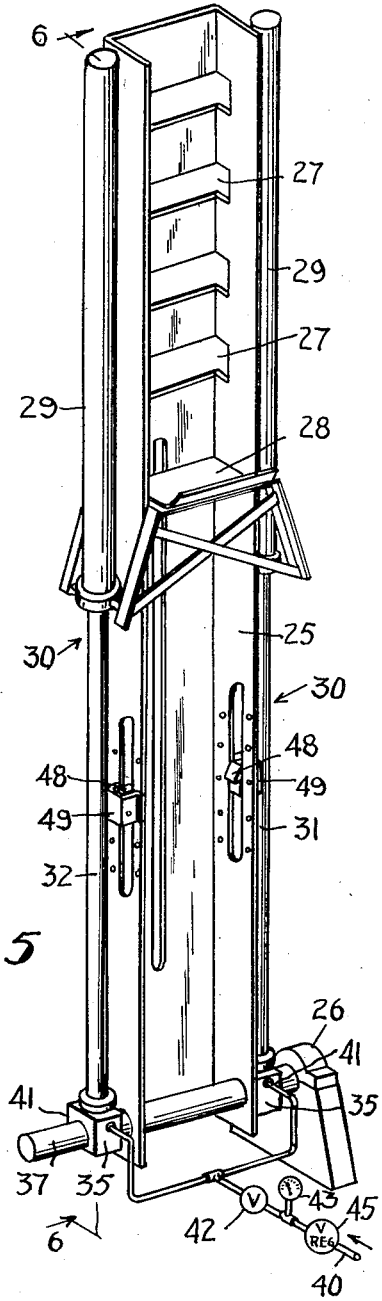
Fig. 5 is a perspective view of another form of my load handling apparatus which may be used in combination with a continuous down-casting apparatus such as is illustrated in Fig. 1.

By reference to Figs. 5 and 6, the trough-shaped cradle 25 is like cradle 10 in Figs. 1 to 4 except that cradle 25 is mounted, adjacent its lower end, in journal blocks 26 for swinging movement between vertical and horizontal positions, said cradle having slots 27 through which conveyor rolls are adapted to project as in Fig. 4.

A billet supporting platform 28 in the form of a table with X-braces as shown is connected at its opposite sides to the lower ends of the upper tubular elements 29 of a pair of vertical fluid cylinders 30. Lower tubular elements 32 are telescoped within elements 29 for axial sliding of the latter on the former, suitable packings 34 being provided to effect a fluid-tight sliding seal. A block 35 is secured to the lower end of each element 32, each said block having a hole 36 therethrough, through which and through corresponding holes in cradle 25, extends a bar 37 which has its opposite end portions journalled in journal blocks 26. Each said block 35 has a passageway 38 through which compressible fluid, usually air in this embodiment, is admitted into the chamber 39 as defined in each cylinder 30, to thus variably preload said cylinders.

As apparent, downward movement of platform 28 effects reduction in the volumes of the chambers 39 in said cylinders 30; and, thus, the platform exerts a progressively increasing upward force in accordance with Boyle's law $(PV = P^1V^1$ where $P$ is the pressure of the fluid at volume $V$ and $P^1$ is the pressure at the increased or decreased volume $V^1$).

In order that said platform 28 be operative to exert, at a predetermined position thereof, an upward force to counterbalance the load thereon, the chambers 39 in cylinders 30 are preloaded by connection of passages 38 to an air pressure supply line 40, and each passage 38 is provided with a valve 41 or like check valve to retain the air pumped into said chambers 39. For convenience, the air pressure supply line 40 may be equipped with a valve 42, a pressure gage 43, and a pressure regulating valve 45. Pressure gage 43 is preferably calibrated in terms of unit weight of the severed lengths or billets 9 of the casting 4. The preload or static pressure adjustment can be made with said platform 28 in any desired position, but preferably is made when said cylinders 30 are fully extended as in Fig. 5, that is, when said platform is at its uppermost position. For a fuller understanding of the adjustment and how it works, let us assume that billets 4" x 4", 6" x 6", 6" x 8", 8" x 8", 8" x 10", 10" x 10", and 12" x 12" have, in round figures, unit weights of 50, 100, 150, 200, 250, 350, and 500 lbs./ft.; that it is desired to cut the casting 4 into billets 9 of length 5' to 10'; that the distance from the torch 8 to the top of the platform 28 is 5'; that the readings on gage 43 of 50 to 500 lbs./ft. correspond to preload or static pressures to exert upward forces on platform 28 of four times the lbs./ft. readings; and that in the stroke range of 0 to 6' the load-deflection curves are substantially straight lines of slope to correspond to the unit weight of the billets. In such example, a billet 9 cut to 5' length just as the lower end engages the platform 28 therefore will cause the latter to descend 1' under the influence of the weight of the 5′ billet. On the other hand, if the billet 9 is cut to 6′, 7′, 8′, 9′, or 10′ length, the platform as moved down by the casting will exert an upward force of progressively increasing magnitude less than the weight of the billet to be severed by an amount equal to the unit weight of the billet in lbs./ft. so that the cut billet will sink 1′ before the platform counterbalances the same.

Now, because the downward movement of the platform 28 is yieldably resisted, it and the billet thereon will tend to move down below the counterbalanced position and then bounce alternately above and below such position until dampened by friction losses. Such bouncing is undesirable for the reason that the top end of the billet 9 may engage and thus reweld to the down-moving casting 4. One way of eliminating or minimizing this bouncing is to form, in the upper end wall 46 of each cylinder element 32, an orifice 47 to throttle the flow of air from the upper to the lower portion of the chamber 39, and therefore, effect a more gradual lowering of the platform and billet to, but not below, the counterbalancing position.

For the purpose of retaining said platform 28 in a depressed position so as to afford clearance for the downmoving casting 4 as the trough or cradle 25 is being swung back to vertical position from its horizontal discharge position as previously explained with reference to Figs. 1 to 4, there is provided on opposite sides of said cradle 25, spring-loaded latches 48 which are adjustable lengthwise of the cradle and which may be actuated by solenoid 49 or other means to release said platform 28 at the proper time. These latches 48 permit downward movement of the platform therebelow, but said platform cannot move upwardly therepast unless the latches are disengaged from said platform as by the solenoid 49.

Obviously, said latches 48 may be automatically operated responsive to the cradle 25 approaching or reaching the vertical position. For example, said cradle may operate a limit switch to energize the solenoids 49 of said latch members 48.

In the case of the fluid cylinders 30 illustrated in Figs. 5 and 6, the volume of the chambers 39 defined thereby varies in about the ratio of 2:1 between the fully extended and the fully contracted positions, and therefore the air pressure will double when said cylinders are moved from fully extended position to fully contracted position.

A greater volume ratio decrease, and thus a greater pressure increase, may be provided by constructing the fluid cylinders 50 of three or more mutually telescoping tubular sections 51, 52, and 53 as shown in Figs. 7 and 8. In Fig. 7, the platform 54 has its opposite end portions connected to the pair of top sections 53; and in Fig. 8, the platform 56 likewise is connected to the top section 53. Guiding of the platform 54 is effected by slots thereof embracing the opposite sides of cradle 57, and guiding of platform 56 is effected as by grooved rollers 58 running on rails 59 secured to the trough or cradle 60. For sake of simplification and unnecessary repetition, the apparatuses of Figs. 7 and 8 do not show the conveyor openings, the latches, the cradle pivots, and other details of construction already described.

In Fig. 5A is shown an automatic latching mechanism for the billet supporting platform 28 which comprises ratch bars 61 mounted on opposite sides of the troughshaped cradle 25 with which pawls 62 cooperate to hold the platform 28 in its lowered position under the influence of the weight of the billet thereon responsive to tilting of the cradle. Said pawls 62 are pivotally mounted on a cross-bar 63 of the platform 28. When the cradle 25 is tilted, the pawls swing into engagement with the teeth of the ratch bars 61, and therefore, during the tilting of the cradle toward horizontal discharge position and then back to vertical position, the platform 28 is automatically held in its depressed position. Thus, it is not required to adjust latches lengthwise of the cradle 25 for each different length billet as is required in the Fig. 5 construction. As the cradle approaches vertical position, the pawls 62 engage vertically disposed stationary runners 64 which cause swinging of the pawls 62 out of engagement with the ratch bars 61 so that the platform 28 can then move upward for engagement by the lower end of the downwardly moving casting and thence downwardly under the influence of the down-moving casting.

In instances where rolls 18 as shown in Fig. 4 are idlers, the pawls 62 may be arranged to be disengaged from the ratch bars 61 as the cradle 25 approaches horizontal discharge position, as by means of horizontal runners (not shown), in which event the pressure in the fluid cylinders 30 will cause the platform 28 to move in a left-hand direction to discharge the severed billet 9 from the cradle 25. This, of course, somewhat limits the use of the apparatus unless other means are employed to depress the platform 28 so as to afford adequate clearance with the down-moving casting as the cradle 25 is being re-swung to the vertical position.

The latching of the platform 28 as soon as the cradle 25 is tilted from vertical has the added function of eliminating partial ejection of the billet during swinging of the cradle toward horizontal discharge position as would otherwise occur owing to the progressively decreasing load of the billet on the platform.

In Figs. 9 to 12, is shown an apparatus resembling that shown in the schematic diagrams Figs. 1 to 4, the cradle 65 in this instance comprising a pair of columns 66 with cross-braces 67 thereacross forming openings for the conveyor rolls of Fig. 4, said cradle being pivotally mounted on stands 68 and as in Figs. 1 to 4 the swinging to discharging position is controlled by a suitable brake 69, and initial tilting is effected by cylinder 70. Within said columns 66 are fluid cylinders 71, like cylinder 30, having a platform 72 secured to the movable elements thereof.

In this case, hoisting of cradle 65 to vertical position is effected by cable 73 connected to the upper end of the cradle at 74, and said cable runs over a sheave 75 to a hoisting drum 76 which is effective to wind up the cable and thus swing the cradle from horizontal to vertical position. Of course, the hoisting drum 76 can also be used, if desired, in the controlled swinging of the cradle from vertical to horizontal position; but as previously mentioned, a suitable friction or solenoid brake 69 may be employed in association with the lower end of said cradle 65.

LOAD HANDLING APPARATUS IN CONJUNCTION WITH VEHICLE SPRING MOUNTINGS

Figure 13:
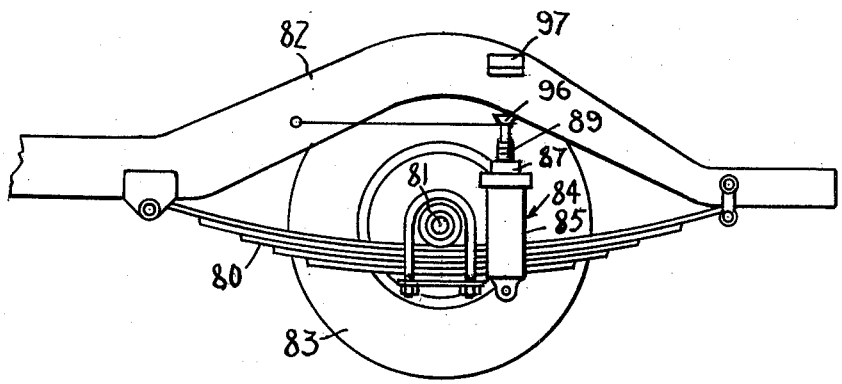
Fig. 13 shows another form of my load handling and supporting apparatus as employed with a spring-mounted vehicle.

As shown in Fig. 13, leaf springs 80 or the equivalent on the rear axle 81 resiliently support the vehicle frame 82, and as previously mentioned, the vehicle springs for pick-up trucks, etc. are usually designed so that predetermined maximum loads may be imposed on the frames or bodies thereof. But, as evident, when the vehicle is driven empty or under very light loads, such springs are much too stiff and result in uncomfortable riding of the vehicle, and is also hard on the vehicle tires 83.

In my invention, I use springs 80 which are designed for desired spring action when the vehicle is driven empty or only lightly loaded. To provide for adjustment of the spring action under heavy loading, there is interposed between the axle 81 and the frame 82, a linkage 84 which is adjustable to react yieldably between the axle and the frame with a force commensurate with the load imposed on said frame.

Figure 14:
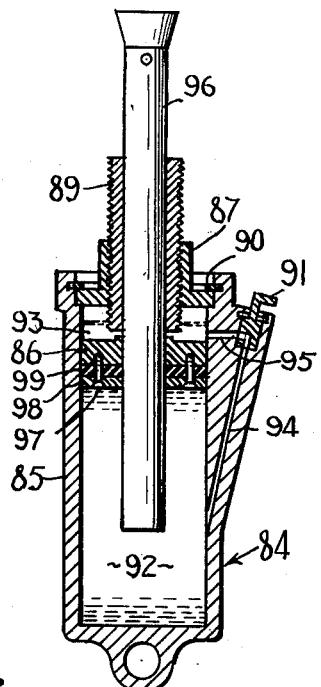
Fig. 14 is a vertical cross-section view, on an enlarged scale, of the apparatus employed in Fig. 13.

Said linkage 84 as best shown in Fig. 14, comprises a cylinder body 85 in which an abutment unit 86 is longitudinally adjustable as by means of a rotatable nut 87 in threaded engagement with the stem portion 89 of said abutment unit, said nut being held against longitudinal movement relative to said cylinder body as by means of a snap ring 90 or other suitable means. When said abutment unit 86 is being adjusted, the plug valve 91 will be turned to open communication between the pressure chamber 92 and the reservoir chamber 93 through passages 94 and 95. Thus chamber 92 will be filled with a desired volume of fluid according to the position of said abutment unit 86.

With the abutment unit 86 in a desired position, the valve 91 is closed, whereupon further rotation of the nut to cause downward movement of said abutment unit will cause an upward displacement of the rod 96, which is slidable in said abutment unit, to a position to engage a buffer plate 97 on the frame 82 and the preload can be made whatever amount is desired. The stem portion 89 of said abutment unit 86 may be graduated in terms of load in pounds or fraction of capacity. When the vehicle is loaded, downward movement of frame 82 will be yieldably resisted by the fluid in chamber 92 acting on rod 96 according to the coefficient of compressibility of the fluid. Hydraulic fluids have a compressibility of about .44% per 1000 p. s. i. and .41% per 1000 p. s. i. above 3000 p. s. i.

The adjustment of said abutment unit 86 varies the compression ratio so that each unit of downward movement of said rod 96 effects a different predetermined increase in the pressure of the fluid in chamber 92 opposing such downward movement for each different compression ratio. This will be discussed in further detail in connection with the curves shown in Figs. 17 to 19.

As shown in Fig. 14, the abutment unit 86 is annular and has secured thereto as by means of screws 97, an annular ring 98, and an annular sealing ring 99 preferably of synthetic rubber or the like, said sealing ring having sealed engagement, not only with the wall of the cylinder body 85, but also with said rod 96.

ARTICLE STORING OR DISPENSING APPARATUS

Figure 15:
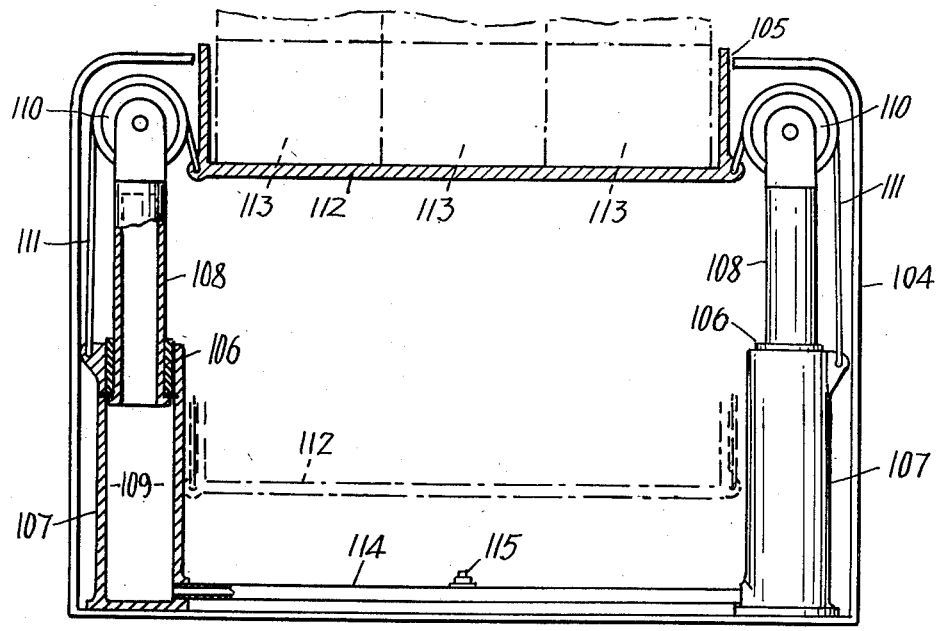
Fig. 15 is a vertical cross-section view showing another form of the present invention as used in conjunction with an article dispensing or storing apparatus.
Figure 16:
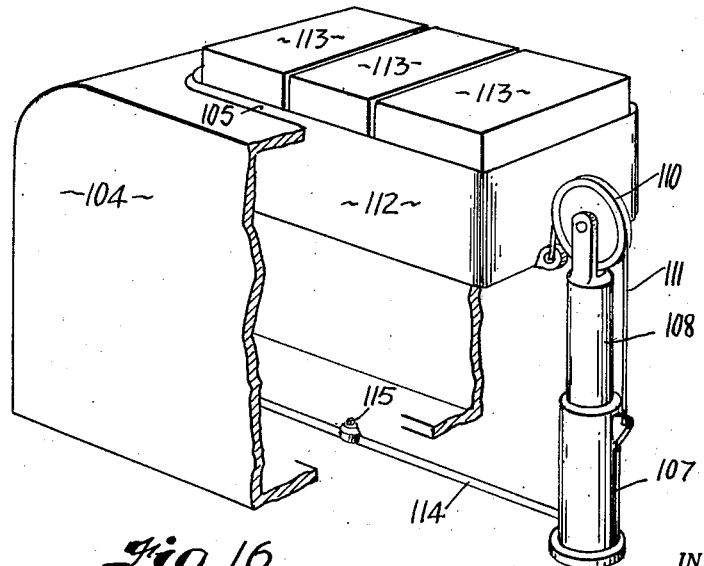
Fig. 16 is a perspective view of the Fig. 15 structure, the cabinet or enclosure for the apparatus being broken away to more clearly show the internal construction.

This structure as shown in Figs. 15 and 16 comprises a generally rectangular box or cabinet 104 having an opening 105 at its top.

Mounted inside said cabinet 104 at opposite sides thereof are a pair of upstanding cylinders 107 in which hollow pistons 108 are vertically reciprocable and slidably sealed by packing ring 106, thus defining variable volume air chambers 109 therein. Each piston 108 is provided with a sheave 110 over which runs a flexible cord or cable 111 anchored at one end to the cylinder 107 and at the other end to an article supporting device 112 which herein is shown as being a tray of size and shape approximately that of the cabinet opening 105. Articles 113 of uniform size and weight are adapted to be stacked in said tray 112.

The two chambers 109 are communicated with one another by means of the conduit 114 having a tire valve 115 or like check valve therein to permit preloading of the cylinders to any desired extent so that when said articles 113 of uniform size and weight are stacked in the tray 112, the top articles of the stacks will be disposed at a substantially constant level for convenient removal thereof or for convenient addition of articles on the tops of the stacks. Therefore, whether articles 113 be added to or removed from the tray 112, the top article or articles 113 will nevertheless always be at approximately the same level. Of course, where there are three stacks of articles as shown, there will be displacement of the tray as articles are added to or removed from one stack, two stacks, or three stacks, but at all times the top articles will be readily accessible. In Fig. 15, in dot-dash lines, is shown the position of the tray 112 when the stacks are several articles high, the air in the chambers 109 then being compressed to counterbalance the load of said articles. As before explained in detail with reference to Figs. 5 and 6, stacks of articles of different sizes and unit weights may be substituted and accommodated by the adjustable preloading feature.

THE GRAPHS OF FIGS. 17, 18, AND 19

The curves in Fig. 17 represent the different conditions which obtain when the compression ratio of the yieldable assembly of the load supporting apparatus is constant and the static pressure therein is varied. Thus, as represented by the inclined dash lines in Fig. 17, the general slopes of the curves vary as the static pressure is increased; and for the ranges of stroke to the ends of the dash lines, the curves are sufficiently straight, for all practical purposes where an exact displacement per unit change in pressure is not required.

The curves in Fig. 18 represent the conditions which obtain when the static pressure in the yieldable assembly of the load supporting apparatus is maintained constant and the compression ratio is varied as in Figs. 13 and 14, for example, the coordinate axes for the Fig. 18 curves again being "Pressure" and "Stroke" as in Fig. 17.

The single curve in Fig. 19 is a composite curve which applies to the conditions of Figs. 17 and 18 when, for example, the "Stroke" scales $a$, $b$, and $c$ are used according to curves $a$, $b$, and $c$ of Figs. 17 and 18.

Other modes of applying the principle of the invention may be employed, change being made as regards the details described, provided the features stated in any of the following claims, or the equivalent of such, be employed.

I therefore particularly point out and distinctly claim as my invention:

1. The combination with continuous down-casting apparatus of the character which includes a chilled mold into which molten metal is adapted to be fed and from which such metal emerges in the form of a downwardly moving continuous casting, and a severing mechanism for severing such casting, as it moves downwardly, into billets of predetermined length, of a billet handling mechanism which comprises a platform positioned so as to be engaged by the bottom of the casting and to be moved downwardly thereby, yieldable means resisting downward movement of said platform, and the progressively increasing length of suspended casting engaged therewith, with progressively increasing force which, at the time of severing, is less than the weight of the billet whereby such billet and platform descend with respect to the bottom of the casting thereabove to a position whereat the reaction force of the platform balances the weight of such billet, and means for discharging the billet from said platform so that the latter may be moved upwardly to again be engaged by the bottom of the continuously downwardly moving and suspended casting, said means for discharging said billet comprising a vertical trough in which said platform is vertically movable, means supporting said trough for movement to a generally horizontal billet discharging position, and latch means to retain said platform at a lowered position so that when said trough is returned to vertical position it will clear the downmoving casting, said latch means being operable to release said platform when said trough is in vertical position so that said platform will move upwardly to meet the bottom of the down-moving casting.

2. In combination, a load supporting platform, yieldable means bearing on said platform and allowing the latter to progressively descend approximately proportionately with a progressively increasing load imposed thereon, a vertical trough along which said platform is adapted to be moved by a downwardly-moving continuous casting which is of progressively increasing suspended weight, means for moving said trough to generally horizontal position for discharge therefrom, by said platform, of a severed length of such casting under the influence of said yieldable means, and latch means engaged with said platform to prevent discharge movement thereof and of the severed length of casting supported thereby during movement of said trough from vertical position to horizontal discharge position.

3. The combination with continuous down-casting apparatus of the character which includes a chilled mold into which molten metal is adapted to be fed and from which such metal emerges in the form of a downwardly moving continuous casting, and a severing mechanism for severing such casting, as it moves downwardly, into billets of predetermined length, of a billet handling mechanism which comprises a platform positioned so as to be engaged by the bottom of the casting and to be moved downwardly thereby, yieldable means resisting downward movement of said platform, and the progressively increasing length of suspended casting engaged therewith, with progressively increasing force which, at the time of severing, is less than the weight of the billet whereby such billet and platform descend with respect to the bottom of the casting thereabove to a position whereat the reaction force of the platform balances the weight of such billet, and means for discharging the billet from said platform so that the latter may be moved upwardly to again be engaged by the bottom of the continuously downwardly moving and suspended casting, said yieldable means comprising telescoped tubular members having a variable volume chamber containing compressible fluid therein and arranged so that as said platform descends, the volume of such chamber is reduced to correspondingly increase the pressure of the fluid, and thus the reaction force exerted by said fluid pressure means on said platform, such chamber being partitioned and including a dampening orifice through which the fluid flows at a rate to eliminate oscillation of said platform when the billet and said platform descend with respect to the casting thereabove.

References Cited in the file of this patent

UNITED STATES PATENTS

| | | |
|---|---|---|
| 1,214,343 | Matthews | Jan. 30, 1917 |
| 1,257,950 | Albright | Feb. 26, 1918 |
| 1,541,957 | Hooper | June 16, 1925 |
| 1,650,680 | Youse | Nov. 29, 1927 |
| 2,030,482 | Summey | Feb. 11, 1936 |
| 2,275,462 | Parilla | Mar. 10, 1942 |
| 2,560,639 | Giesler et al. | July 17, 1951 |
| 2,582,329 | Harter et al. | Jan. 15, 1952 |
| 2,733,490 | Yates et al. | Feb. 7, 1956 |